US009318028B1

(12) United States Patent
Ingesson et al.

(10) Patent No.: US 9,318,028 B1
(45) Date of Patent: Apr. 19, 2016

(54) BREACHING TRAINING DOOR

(71) Applicant: 5.11 Inc., Modesto, CA (US)

(72) Inventors: Lars Ingesson, Hollviken (SE); Patrik Gustavsson, Bunkeflostrand (SE)

(73) Assignee: 5.11 Inc., Modesto, CA (US)

( * ) Notice: Subject to any disclaimer, the term of this patent is extended or adjusted under 35 U.S.C. 154(b) by 399 days.

(21) Appl. No.: 13/889,228

(22) Filed: May 7, 2013

Related U.S. Application Data

(60) Provisional application No. 61/688,111, filed on May 7, 2012.

(51) Int. Cl.
*G09B 9/00* (2006.01)
*G09B 19/00* (2006.01)

(52) U.S. Cl.
CPC ........ *G09B 9/00* (2013.01); *G09B 9/003* (2013.01); *G09B 19/00* (2013.01)

(58) Field of Classification Search
USPC .......................................................... 434/219
See application file for complete search history.

(56) References Cited

U.S. PATENT DOCUMENTS

| 3,808,759 | A | * | 5/1974 | Carmichael | ............ | 52/212 |
| 5,080,354 | A | * | 1/1992 | McDougall | ............ | 292/145 |
| 6,877,988 | B2 | * | 4/2005 | Phillips et al. | ............ | 434/226 |
| 2010/0304344 | A1 | * | 12/2010 | Walker | ............ | 434/226 |
| 2011/0223569 | A1 | * | 9/2011 | Perrone | ............ | 434/219 |
| 2012/0244512 | A1 | * | 9/2012 | Norris | ............ | 434/387 |

OTHER PUBLICATIONS

Description and views of BTI Pry Doors, print from breachingtechnologiesinc.com website, copyright 2012, Breaching Technologies, Inc., 2 pages.
Description and views of All Purpose Breaching Door, print from 6secondtactical.com website, date unknown, 3 pages.
Description and views of Tactical Breaching Cage, product information sheet and print from bomartactical.com website, date unknown, 2 pages.
Description and views of Tactical Breach Door, print from actiontarget.com website, copyright 2013, Action Target, 2 pages.
Description and view of Pry RatDoor, print from ratools.com website, date unknown, 1 page.
Description and view of Breaching Door, print from mgmtargets.com website, copyright 2013, MGM Targets, 1 page.

* cited by examiner

*Primary Examiner* — Xuan Thai
*Assistant Examiner* — James Hull
(74) *Attorney, Agent, or Firm* — Thomas M. Freiburger

(57) ABSTRACT

A training door for breaching tools has a frame on which the door is hung by hinges at a hinge edge, while at an opposite edge being retained to a jamb by one or more non-shearing bolts. When the door is forced by a breaching tool at the bolt location, the jamb is forced laterally away from the door edge, against rubber mounts that allow limited jamb movement. As the door is forced in (or out, depending on its swing direction), with the jamb spread away somewhat the bolt will bend and fail pulling out of its socket. Replaceable sleeves are secured to the door edge, in several sections of the door to avoid breach tool damage on the door itself.

10 Claims, 10 Drawing Sheets

DETAIL A
SCALE 2:5

DETAIL B
SCALE 2 : 5

BREACHING TRAINING DOOR

This application claims benefit of provisional application No. 61/688,111, filed May 7, 2012.

BACKGROUND OF THE INVENTION

This invention concerns breaching of entry doors by force, such as by police or military personnel, and specifically a training door for training the use of breaching tools, a door that can be used many times without replacement.

Breaching tools are used to quickly force open doors and windows in emergency situations. Special tools have been developed for this purpose, large crowbar-like steel tools with specially-designed heads or working ends. Training is required for the proper and most efficient use of these tools, and for this purpose training doors have been produced and found effective in demonstration of breaching tools and the correct techniques of their use.

U.S. Pat. No. 6,877,988 describes one type of breach training door. That door is based on shear pins that extend between bores of a door edge and of a door jamb, in the positions of deadbolts. When the door is forced using breaching tools the pin or pins will shear off to allow the door to open. In the system described in the patent, the door can sustain damage over several breachings, requiring its repair or replacement. In addition, many deadbolts in actual breaching situations will not shear, but instead will bend to the point that, along with the forced movement of the jamb spreading away from the door, will allow the door to be forced open.

Ideally, a breach training door/frame assembly would closely simulate the breach conditions of typical actual entry doors, would be easily resettable after a breach, would be virtually undamaged after a breach, would adapt to uneven terrain for use outdoors, and would permit the use of hydraulic breaching tools without damage to the door or frame.

SUMMARY OF THE INVENTION

The breach training door of the invention meets these requirements with an efficient, rugged door and frame assembly supported by adjustable leveling struts at left and right sides. One or more deadbolts acting between the door edge and jamb are simulated by heavy, bendable bolts which can be at any or all of multiple points along the height of the door. The frame comprises three fixed members—threshold, overhead and upright hinge side—and a jamb that can be spread laterally away from the door with sufficient breaching force. Rubber mounts at top and bottom enable this displacement, with a fixed stop to limit the movement, allowing the use of hydraulic spreader tools without damage. Battering rams can also be used, with limited damage.

For extended life of the door assembly, replaceable metal sleeves cover the door edge, and these may be in two or three sections down the door edge to localize damage to the sleeves from the breaching tools. Sleeves may also be secured on the jamb, for the same purpose. Quick-connection fastening is provided, to replace a protective sleeve when needed.

It is among the objects of the invention to improve stability, performance, ruggedness, utility, training value and economy of a breaching training door. These and other objects, advantages and features of the invention will be apparent from the following description of a preferred embodiment, considered along with the accompanying drawings.

DESCRIPTION OF PREFERRED EMBODIMENTS

Figure 1:
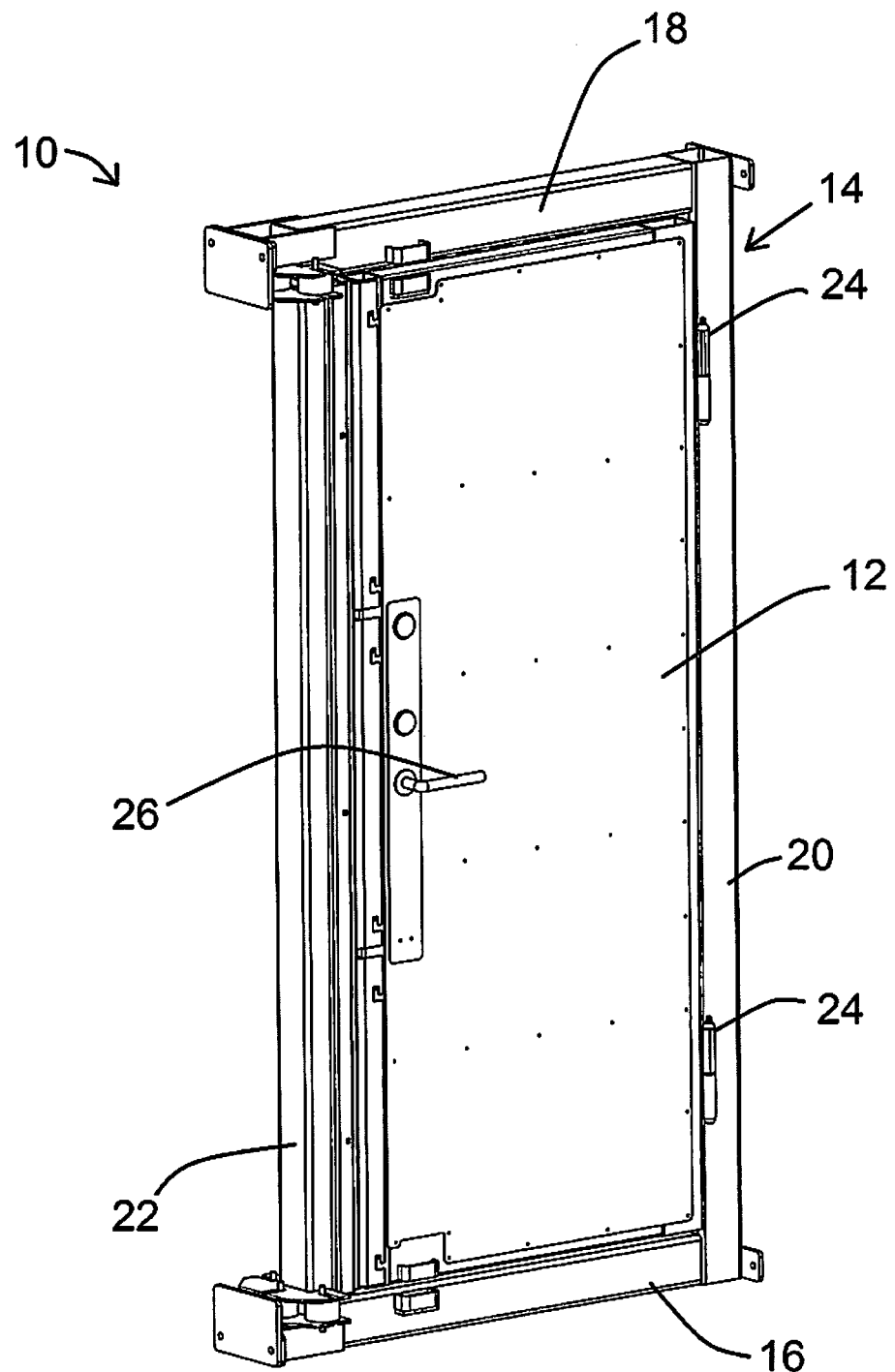
FIG. 1 is a perspective view showing a breach training door of the invention.

FIG. 1 shows an assembly 10 of a training door 12 and frame 14. The frame 14 is composed of rigidly fixed together horizontal threshold member 16, overhead horizontal member 18 and hinge side upright member 20, and an upright jamb 22 which is afforded limited outward (to left in the drawing) displacement when the door 12 is breached using a breaching tool. All structural components 16, 18, 20 and 22 of the door frame are of steel or other high strength metal, and preferably the door as well. Hinges are shown at 24 in FIGS. 1 and 2, and the door handle at 26, for this door 12 that swings outwardly as seen in the drawing. Breaching tools can be applied to breach the door from either the outwardly swinging side seen in FIG. 1 or 2, or from the opposite side, at which the door opens away from the breacher (swinging inwardly to a building).

Figure 2:
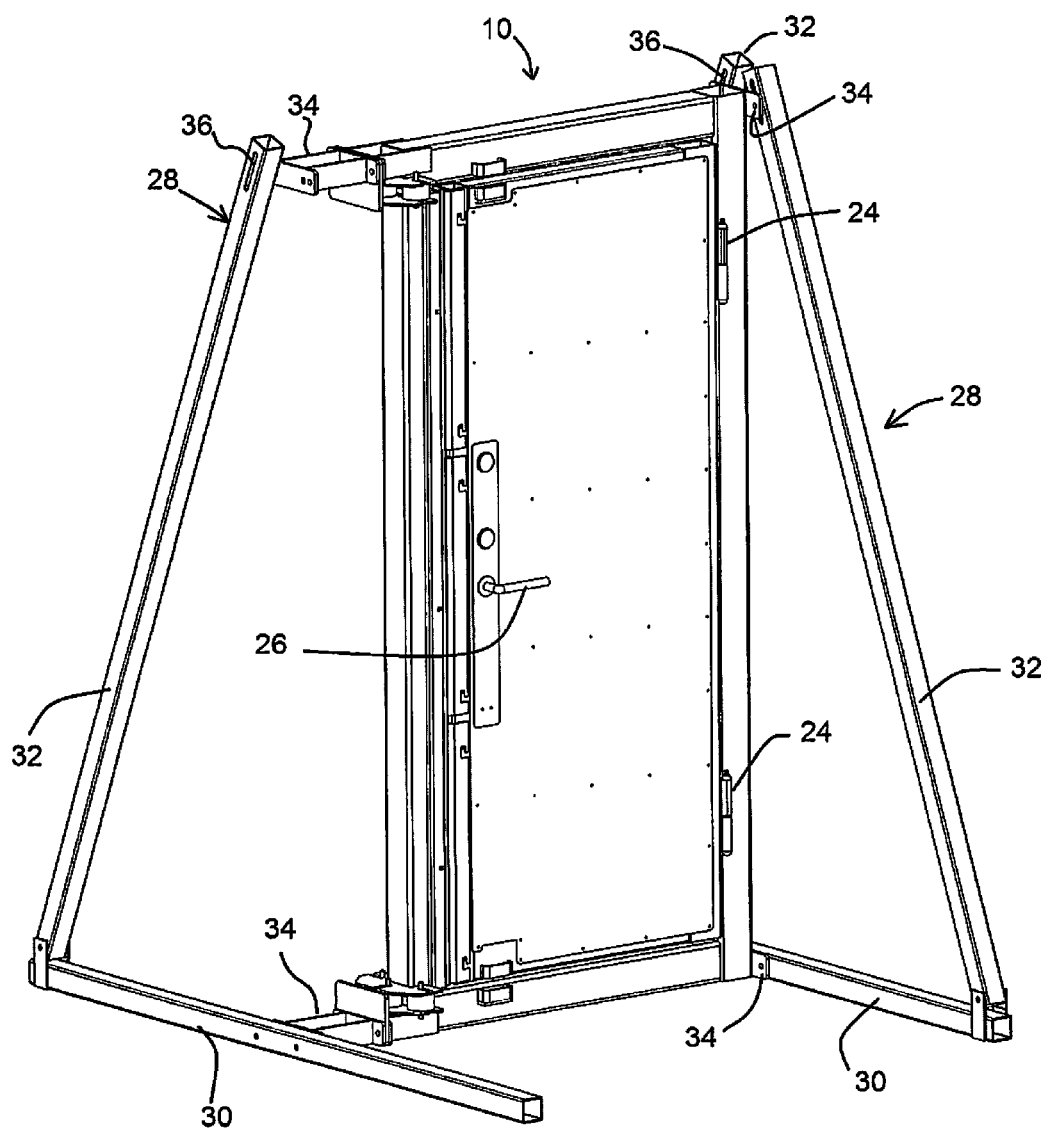
FIG. 2 is another perspective view of the door, showing support struts for retaining the door and frame assembly upright.

FIG. 2 shows the door/frame assembly 10 supported in the upright position by left and right strut frames or A-frames 28. These consist of structural channels or box beams, for example, as shown at 30 (base members) and 32 (obliquely angled struts). The struts 32 are secured to the base members 30 in pivoted connections, and to the top of the door frame via connection brackets 34. The base members 30 are also secured to the door frame via brackets 34. The front left strut is omitted in FIG. 2 for clarity. An important aspect of the invention is the connection of each strut at the top end to the door frame. This is via slotted fastener holes 36 in the struts, through which bolts (not shown) connect the strut to the connector bracket 34. By these connections the door can be adjusted to a substantially upright plane position even on sloped outdoor terrain, where breaching training of it is conducted.

Figure 3:
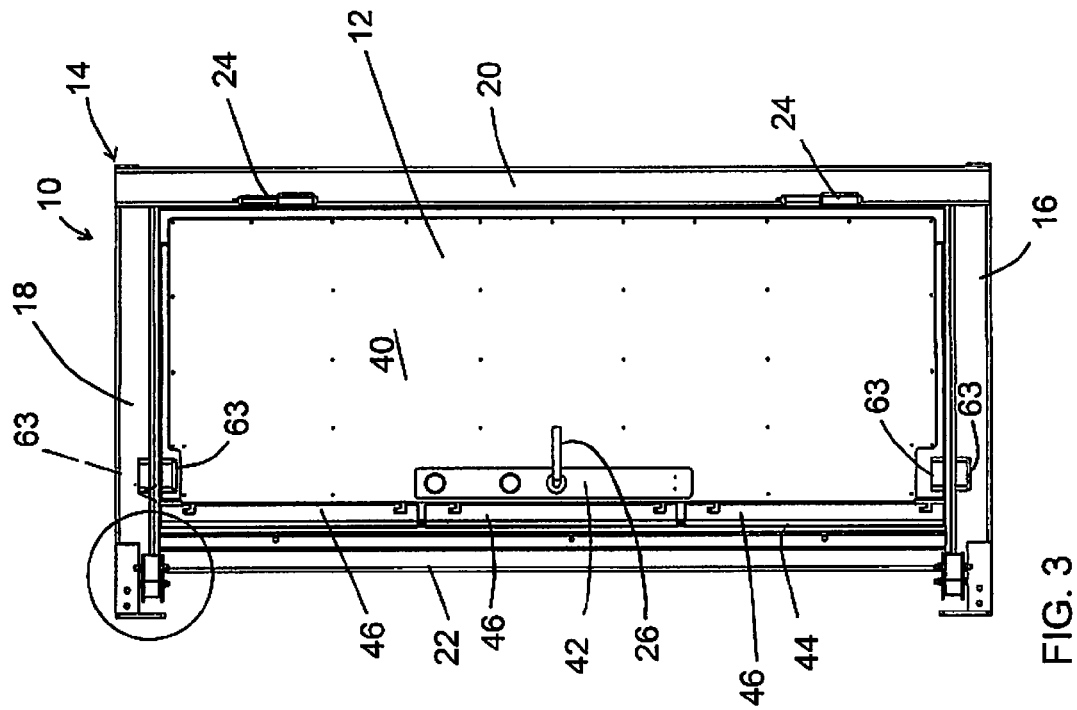
FIG. 3 is a front elevation view of the door and frame assembly.

FIG. 3 shows the door/frame assembly 10, again from the outward-swinging side, in greater detail. The door 12 preferably is metal, or at least has a heavy metal plate 40 at its surface. The door handle 26 is mounted in a security plate 42 near the door latching edge 44. The door edge is protected by protector sleeves 46, preferably of steel, which may be ¼ inch thick structural steel channels. As shown, three protector sleeve sections 46 can be provided, so that damage from a breaching tool is localized. These heavy steel protectors will endure multiple exercises and may need replacement only after a dozen or more breachings against the particular protector. When needed, the protector sleeves are quickly removable and replaceable on the door edge as explained below.

Figure 4:
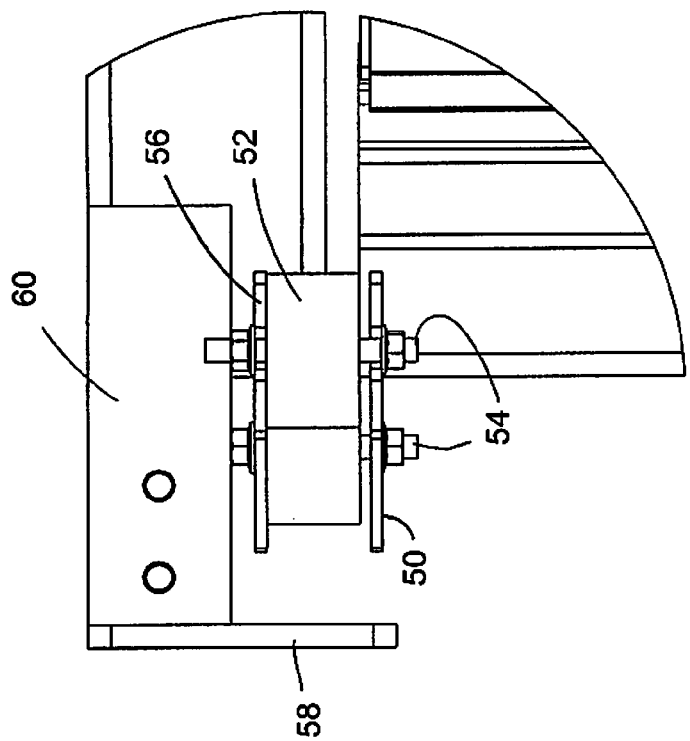
FIG. 4 is an elevation view with a detail of the door jamb mounting.
Figure 5:
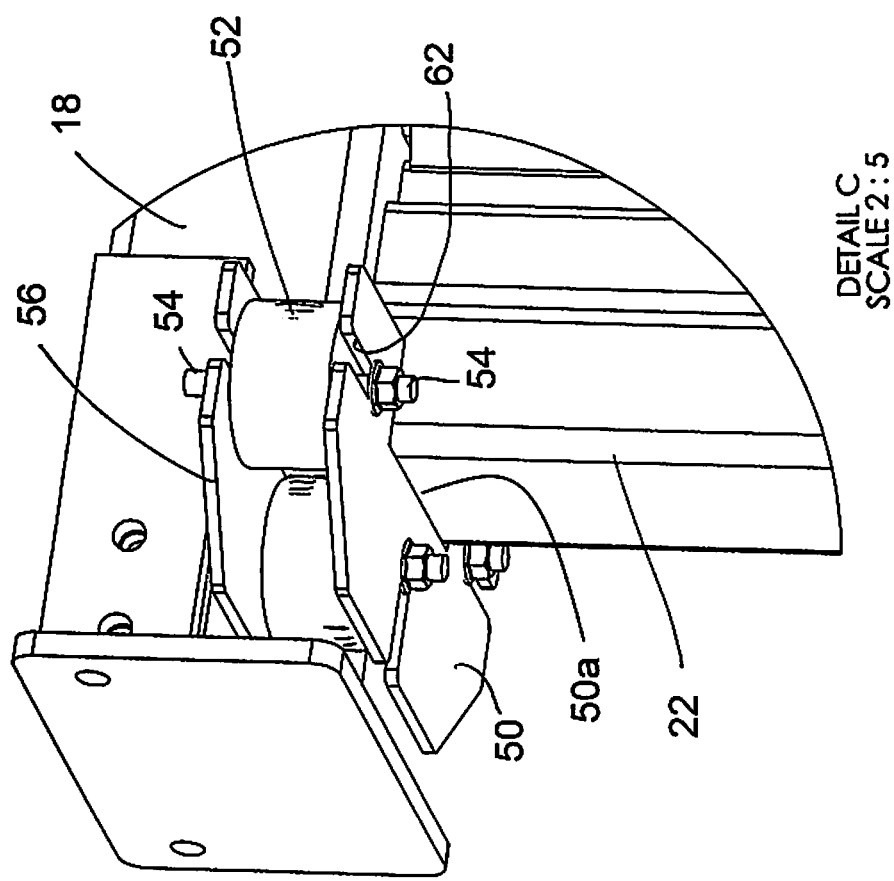
FIG. 5 is a perspective view with another detail of the door jamb mounting.
Figure 6:
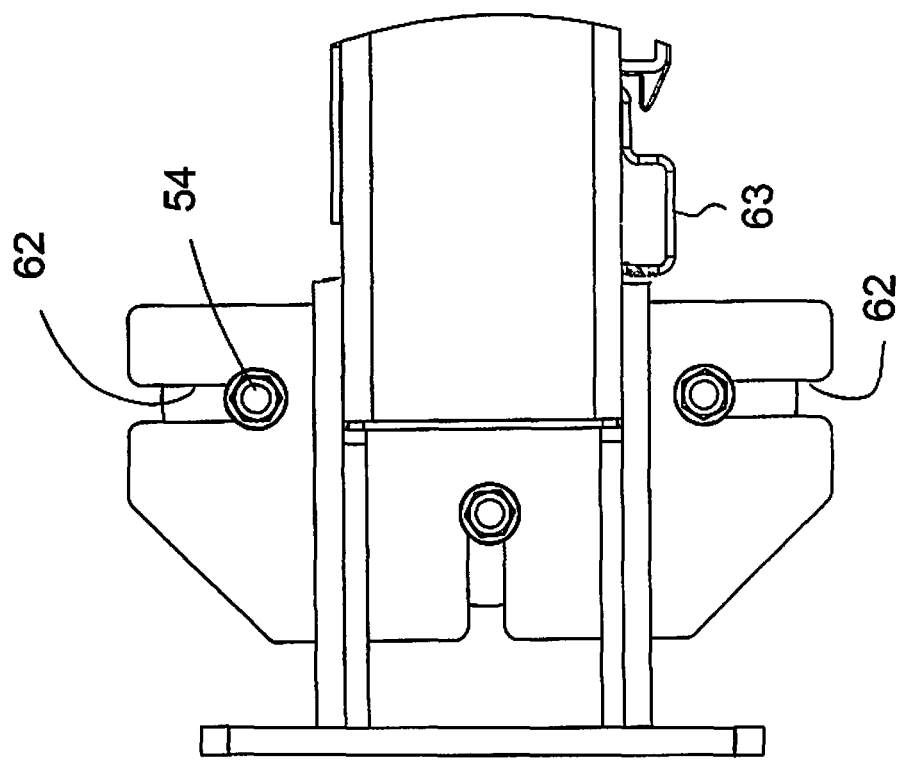
FIG. 6 is a top plan detail view, again showing the door jamb mounting.

FIGS. 3 through 6 show an important feature of the breaching door assembly, allowing forceable displacement of the door jamb 22 without damage. At both top and bottom, the jamb 22 engages with a horizontal plate 50, by nesting in a recess 50a of the plate (where it may be welded). The plate 50 restrains outward displacement of the jamb 22 away from the door edge, by rubber discs or bushings 52 secured to the plate 50 with machine bolts 54. The bushings 52, which may be automotive engine mounts or similar heavy rubber discs or blocks, are firmly held between the jamb-connected plate 50 and a parallel plate 56 above (in the case of the upper end) or below (in the case of the lower end of the jamb). That plate 56 is fixed permanently to the overhead door frame member 18 (and to the threshold horizontal frame member 16 at the lower end). The connection is preferably via a weld to the frame member 18 (or 16), or by weld to an intermediate connecting bracket or plate, not seen in the drawing (even if not welded, the jamb 22 is connected to the threshold and upper horizontal frame members 16 and 18 in this way). Thus, the plate 50 moves differentially to the plate 56 when the jamb is forced outwardly during a breach exercise. The rubber mounts or bushings 52 are racked, distorted in shape by the differential movement, when the jamb and plate 50 are forced to the left as seen in FIGS. 3, 4 and 5.

The breaching door assembly of the invention has an important feature preventing damage to the assembly from over-displacement of the jamb. A hard stop in the displacement in the jamb is provided by a heavy plate 58 acting as an end plate to put a fixed limit on outward displacement of the plate 50 and of the door jamb. The stop plate or end plate 58 is fixed to a bracket 60 that is in turn fixed, as by welding, to the overhead structural frame member 18. The limit of travel may be about 20 to 25 millimeters, i.e. about one inch, at which limit the jamb-connected plate 50 abuts with the stop plate 58.

Note that the machine bolts 54 reside in plate holes or slots 62 that are large enough not to bind with the bolts during displacement, which could prematurely limit displacement or distort the bolts or plates.

FIGS. 1-3 and 6 also show pairs of steel brackets 63, essentially U-shaped loops, at top and bottom of the door near the latching edge 44. Of each pair one is on the door and one on the door frame. Each pair of loops or brackets is configured to receive wood door-blocking stakes or pegs (not shown) inserted vertically into the loops, fitting snugly, to hold the door shut from the outwardly-opening side so as to resist opening when breaching tools are used at the opposite side. One, two or three wood stakes (e.g. about 1"×½" each) can be put in each pair of loops for selected resistance against door breach, for varied levels of training. These break on a successful breach of the door. Breach tools or battering rams can be used. The breaking stick lock points can be with the stakes alone or in combination with one or more of the bolt-simulating pins as described below in reference to FIG. 7.

Figure 7:
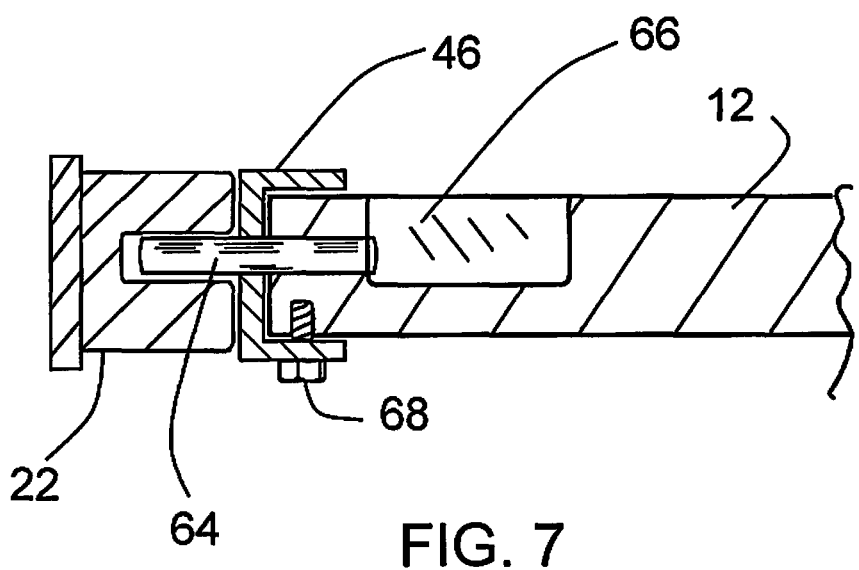
FIG. 7 is a plan cross section view showing the door and jamb, the door being locked in place by one or more lock bolt-simulating pins.

FIG. 7 shows in plan cross section a portion of the door 12 and the jamb 22 adjacent to the door edge, and revealing a pin 64 that acts a locking bolt between the door 12 of the jamb 22. The pin resides in bores of the door and the jamb, and extends through the protector sleeve 46 as indicated. To load a pin 64 into the bolt-locking position, the pin is put into a recess 66 in the side of the door not seen in FIGS. 1-3, i.e. the door side used for training on inwardly swinging entry doors. The pin is put into the slot 66 and then through the door bore and into the jamb as shown. The pin is difficult to retrieve once put in position. As indicated, the lock bolt-simulating pin 64 is positioned in solid portions of the door and the jamb. The recesses and bores can be at, for example, six positions along the door edge for six different lock points. Any number of them can be used for a training exercise.

FIG. 7 also shows a machine bolt 68 that retains the protector sleeve 46 in place on the door.

Figure 8:
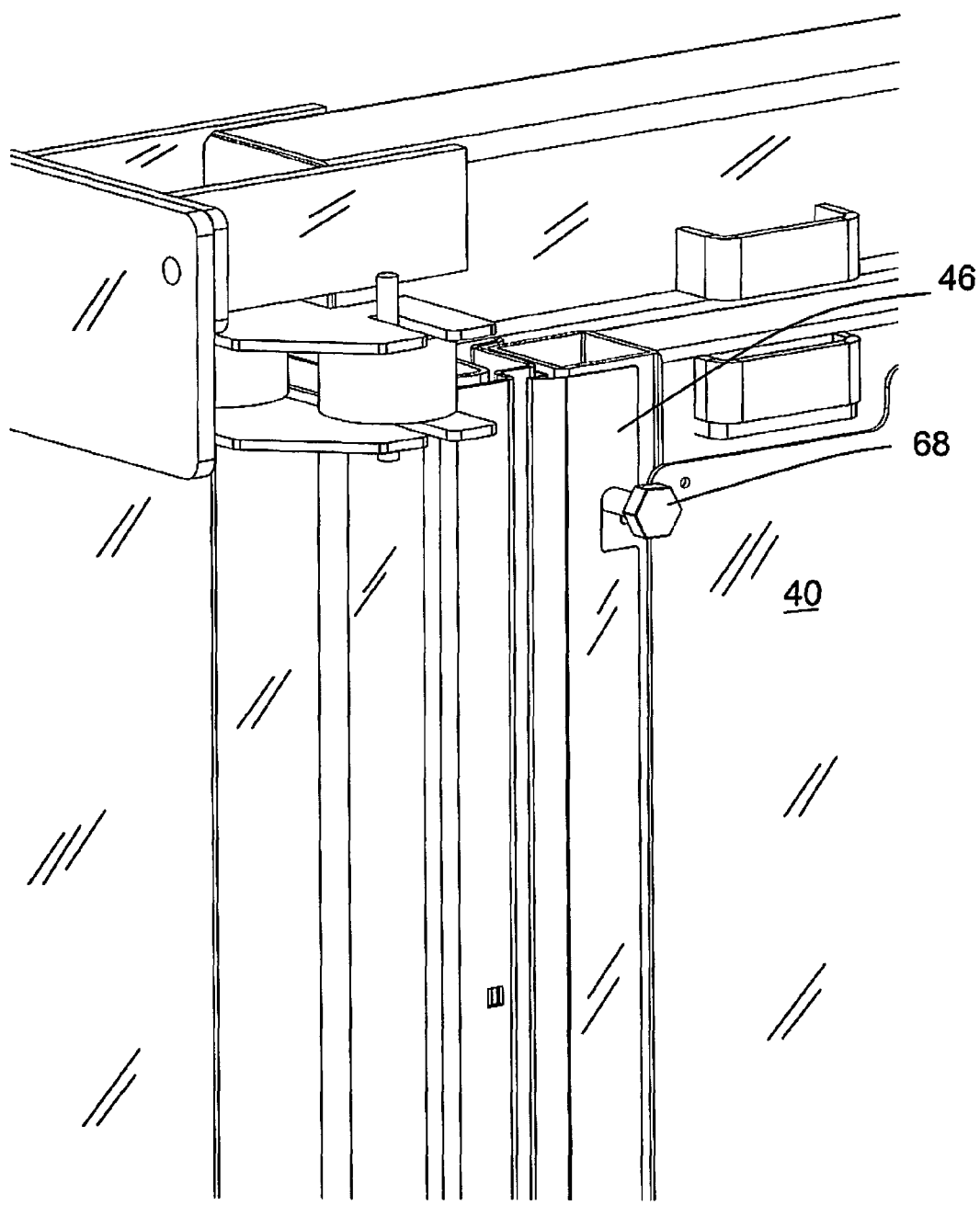
FIG. 8 is a detail perspective view indicating a preferred manner of fastening protective sleeves to the door edge.

FIG. 8 shows in perspective a portion of the door and indicates in better detail the quick-release retention means for retaining the replaceable protector sleeves 46 in place on the door edge. The machine bolts 68, which can be screwed into threaded holes in a solid metal portion of the door or through bolts with nuts on the opposite side, are loosened for removal of a damaged protector sleeve 46. The sleeve is then lifted up and pulled out, to the left in the drawings, off the edge of the door. A replacement protector sleeve is then inserted over the bolts, and dropped into place, and the bolts are tightened.

Figure 9:
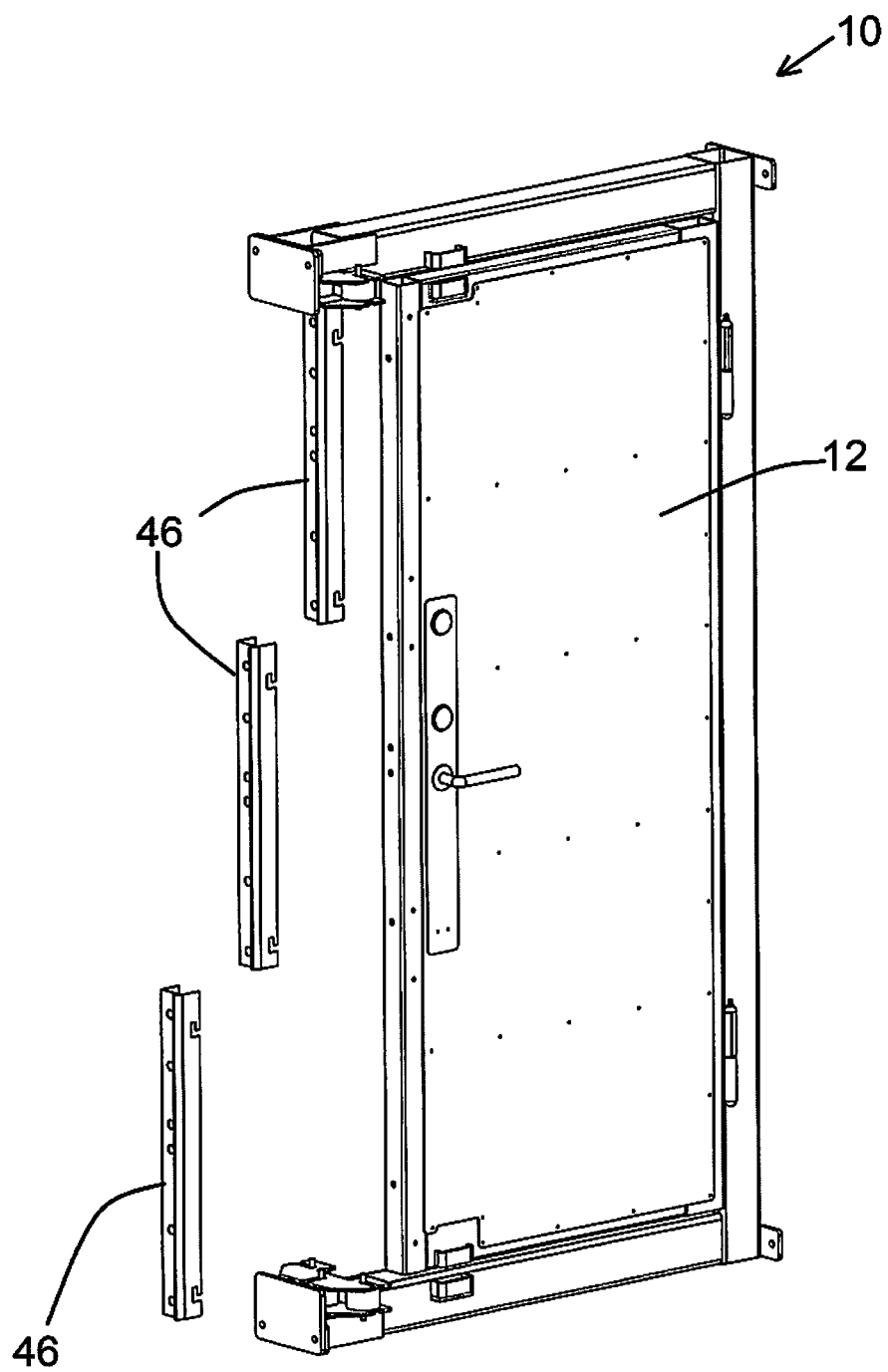
FIG. 9 is a perspective view showing the door and frame assembly and indicating three protective sleeves to be assembled onto the door edge.

FIG. 9 indicates the preferred series of three protector sleeves assembled down the edge of the door. A single sleeve could be used if desired, but the system is more economical if two or three sections are used, each separately replaceable, so the distortion or damage is localized and each section can be replaced individually and only as needed.

Figure 10:
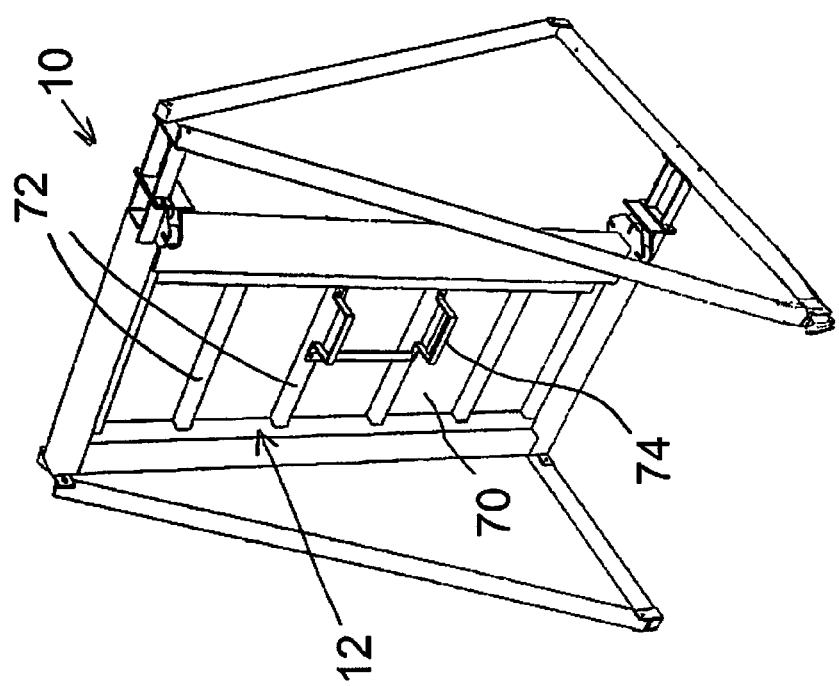
FIG. 10 is a perspective view showing the door/frame assembly from the side opposite that of FIGS. 1 and 2.

FIG. 10 shows the door/frame assembly 10 from the back side, i.e. the opposite from that of FIGS. 1 and 2, and the side from which one practices breaching an inwardly-swinging door. In the door 12 illustrated, the door side 70 is shown with laterally extending structural members 72. Secured to these lateral members, or to other structure of the door, is a metal bracket 74 with two U-shaped portions as shown, for the purpose of receiving one or several 4"×4" lengths of dimensional lumber, in vertical orientation. This is to provide a heavy wood surface to batter the door for breaching, for training in breaching an inwardly-swinging entry door. Breaching can also be used for breaching between the door and the jamb.

Figure 11:
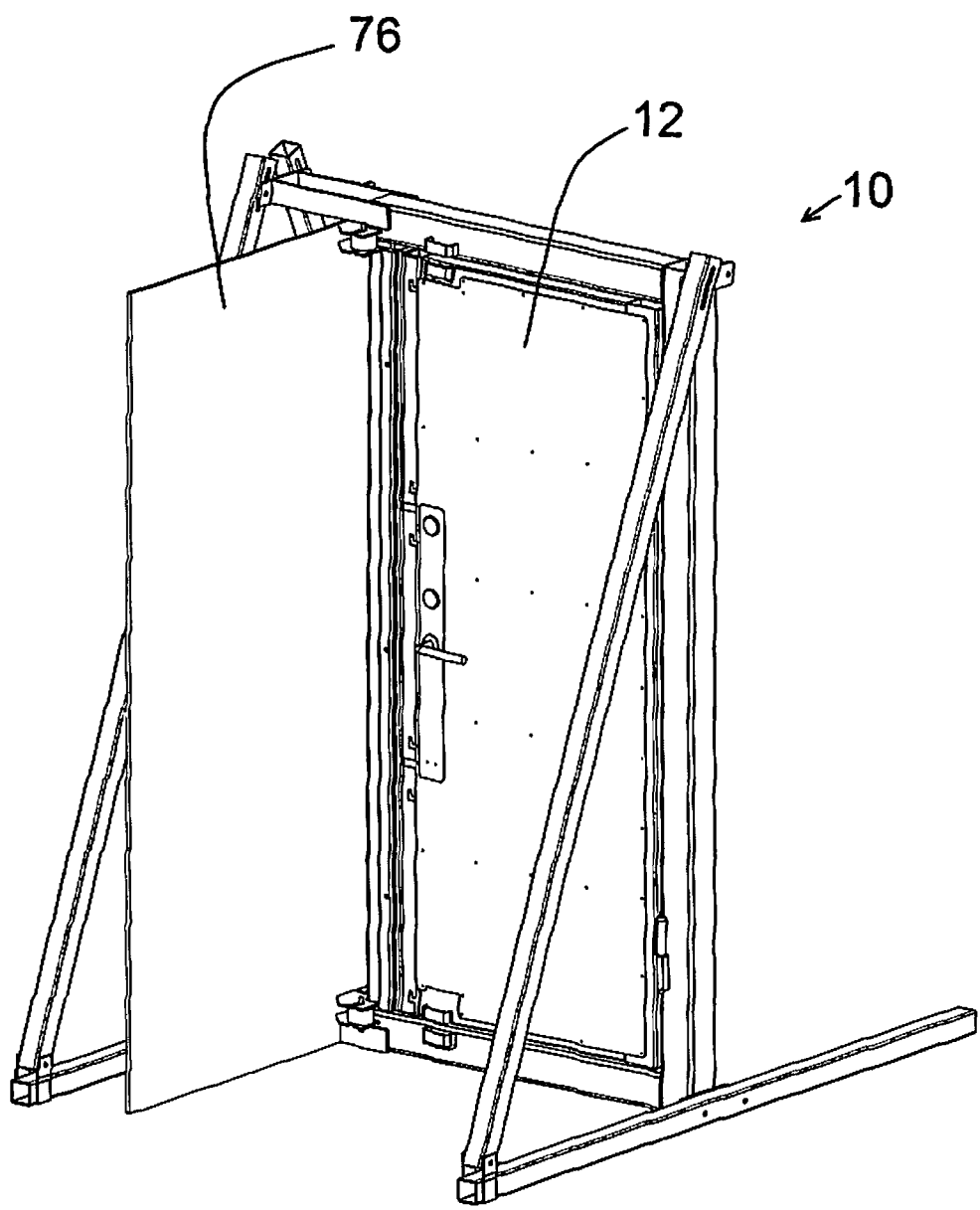
FIG. 11 is another perspective view of the door/frame assembly showing a simulated side wall secured to the frame at right angles to the door.

FIG. 11 shows in perspective the door/frame assembly 10, with a sheet of plywood 76 secured to the frame and oriented at right angles to the door 12, so as to simulate a side wall that is close to the latching edge of the door in an outwardly-swinging entry door situation. This use of breaching tools is somewhat more difficult and requires certain technique that can be trained for using the assembly shown. The plywood sheet 76 can be retained to the frame by brackets connected to the strut frame 28 (brackets not shown).

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A reusable training door for training the use of breaching tools in forcing open a locked door, comprising:
   a door frame, including structure supporting the door frame in an erect, essentially vertical position, and the door frame including, connected together, a threshold horizontal member, a hinge side upright member, an overhead horizontal member and an upright jamb,
   a door supported by hinges on the hinge side upright member of the door frame, the door having a hinged edge and a latch edge, and including a bolt lock engaged between the latch edge of the door and the upright jamb of the door frame, the door frame including rubber mounts at top and bottom ends of the jamb connected to the jamb and the horizontal members and normally retaining the jamb in a normal position with the rubber mounts essentially undeflected and allowing movement of the jamb outwardly away from the latch edge of the door during a breaching operation using a breaching tool, the rubber mounts being positioned to deform elastically to allow the outward movement of the jamb away from the door when sufficient force is applied to the jamb by the breaching tool, and including a fixed stop connected to the door frame at each of top and bottom of the door, limiting outward movement of the jamb to a predefined distance, and including a removably replaceable protective covering sheath of bend resistant metal secured releaseably to the latch edge of the door to protect the door's latch edge when the breaching tool is engaged to breach the door.

2. The reusable training door of claim 1, wherein the protective covering sheath comprises a plurality of separate, independent sections of protective metal sheath arranged in tandem, so that individual sections can be replaced as needed when damaged.

3. The reusable training door of claim 2, wherein three separate sheath sections are included down the height of the door edge.

4. The reusable training door of claim 1, wherein the protective covering sheath is retained in place at the door edge by a quick-release attachment and extends substantially through the height of the door.

5. The reusable training door of claim 1, wherein the stop limiting outward movement of the jamb comprises a bracket secured to the overhead horizontal member of the door frame, the bracket being positioned to be engaged by structure connected to the jamb.

6. The reusable training door of claim 1, wherein the door includes multiple bolt lock points extending between the door edge and the jamb, each of which is capable of receiving a metal bolt which will bend when sufficient force is applied to the door to breach the door.

7. The reusable training door of claim 1, wherein the fixed stop is positioned to allow outward displacement of the jamb of about 20 to 25 millimeters.

8. The reusable training door of claim 1, wherein the structure supporting the door in erect position comprises obliquely angled struts secured to the hinge side of the door frame and to the door latch side of the door frame, the struts being obliquely angled relative to vertical, and slots co-acting between the upper end of the door frame and the angled struts to allow adjustment of door orientation to vertical when the door frame is placed on uneven terrain.

9. The reusable training door of claim 1, further including breaking stick lock points at the top and bottom of the door.

10. The reusable training door of claim 9, wherein each of the breaking stick lock points comprises, at each of the top and bottom of the door, a pair of adjacent, aligned brackets on the door and the door frame positioned to receive one or more vertically inserted wood stakes, the wood stakes being breakable when the door is successfully breached.

* * * * *